(12) United States Patent
Klein

(10) Patent No.: US 6,178,523 B1
(45) Date of Patent: Jan. 23, 2001

(54) BATTERY-OPERATED DEVICE WITH POWER FAILURE RECOVERY

(75) Inventor: Thomas Klein, Union City, CA (US)

(73) Assignee: Philips Consumer Communications LP, New York, NY (US)

(*) Notice: Under 35 U.S.C. 154(b), the term of this patent shall be extended for 0 days.

(21) Appl. No.: 09/096,696

(22) Filed: Jun. 12, 1998

(51) Int. Cl.[7] .................................................. G06F 11/00
(52) U.S. Cl. ............................ 714/24; 714/15; 713/340
(58) Field of Search ............................... 714/24, 22, 14, 714/23, 13, 16, 15; 713/323, 324, 330, 340

(56) References Cited

U.S. PATENT DOCUMENTS

| | | | | |
|---|---|---|---|---|
| 4,907,150 | * | 3/1990 | Arroyo et al. ........................ | 364/200 |
| 5,021,983 | * | 6/1991 | Nguyen et al. ...................... | 364/707 |
| 5,369,802 | | 11/1994 | Murray ................................. | 455/351 |
| 5,530,877 | * | 6/1996 | Hanaoka ............................... | 395/750 |
| 5,687,308 | * | 11/1997 | Jardine et al. .................. | 395/182.02 |
| 5,884,146 | * | 3/1999 | Simmons .............................. | 455/66 |
| 5,935,259 | * | 8/1999 | Anderson .............................. | 714/22 |

FOREIGN PATENT DOCUMENTS

| | | | | |
|---|---|---|---|---|
| 0607919A2 | 7/1994 | (EP) | ............................... | H04M/1/72 |
| 2270445A | 3/1994 | (GB) | ............................... | H04Q/7/04 |
| 58-223947 | * 7/1985 | (JP) | ................................. | G06F/9/46 |
| 62-054658 | * 9/1988 | (JP) | ................................. | G06F/1/00 |
| 07107027A | 4/1995 | (JP) | ............................... | H04B/7/26 |

* cited by examiner

Primary Examiner—Robert W. Beausoliel, Jr.
Assistant Examiner—Scott T. Baderman

(57) ABSTRACT

A battery-operable portable electronic device, having a removable main power source and an auxiliary power source, generates a power failure interrupt signal when it detects a power failure of the removable main power source. Upon detection of the power failure, the electronic device enters a power down mode in which it monitors recovery from the power failure. The electronic device monitors recovery from the power failure by using a battery check routine it pushes on the stack of a microcontroller, and pops off the battery check routine from the stack upon determining a stable recovery, while returning to an exact point in a main program it left when it detected the power failure, the exact point in the main program being represented by a program counter value automatically pushed on the stack upon occurance of the power failure interrupt signal.

13 Claims, 3 Drawing Sheets

BATTERY-OPERATED DEVICE WITH POWER FAILURE RECOVERY

BACKGROUND OF THE INVENTION

The present invention relates generally to battery operated devices powered by a removable main power source, and provided with an auxiliary power source as a battery backup device, and methods for operating the same. In principle, the auxiliary power device can be any device that can store energy for a predetermined time, such a battery, a large charged capacitor, or the like. Such battery operated devices include communication devices such as pagers, mobile radio handsets, cordless telephones, or the like.

Current battery backed devices deal with the removal of the removable main power source by resetting the device after the main power source is replaced and attempt to restore and/or recover any information which was stored in the device. Any operation which was in progress when the main power source was removed, either physically or as the result of a battery bounce, is aborted. Resetting the device and attempting recovery has caused numerous software defects to be inserted. This is because the device could have been in any state prior to the main power source or battery being removed and therefore the associated variables or data were in a modified state. After resetting the device, every possible variable/data combination needed to be accounted for, otherwise the device would not be reset and powerup correctly. Such current devices also cause the user to become annoyed when, in the middle of a long operation, either a battery bounce or other main power source removal causes the device to reset, thereby forcing the user to duplicate the operation.

Other battery backed devices deal with hardware and/or mechanical mechanisms to replace the main power source with a backup cell when the main power source is removed. These solutions do not elaborate on the operation of the device while the main power source is removed or on the operation when the main power source is replaced. In such solutions, typically the device is reset when the main power source is replaced and extensive validation of the data has to be performed to determine if RAM data need to be cleared. Upon any type of battery bounce these solutions will cause a device reset and attempt to recover memory. This has proven to be unacceptable to users. Some examples are if the user is in the process of setting time or alarms and the device is dropped causing a battery bounce of the main power source. Upon resetting, the alarms/time may be in an unknown state, causing the user to proceed back to the screens and reenter the data. Examples of such hardware and/or mechanical mechanisms are disclosed in the U.S. Pat. No. 5,369,802, where a break-before-make-switching arrangement is provided for guaranteeing that first contact is made with a new battery replacing the old battery which is to be removed, in the British Patent Application GB 2 270 445, where data is stored upon detection of battery removal using a switch, and the Japanese Patent Application 0 07107027 A, where a built-in battery takes over while the main power source is being replaced.

In the European Patent Application EP 0 607 919, a software solution is provided in which the current operating state of the device is stored in a non-volatile RAM upon detection of electrical disconnection of the main power source. Additionally, the current time of the device is stored in the RAM as well. Depending on the applied microprocessor platform storing the operating state in non-volatile RAM has the following disadvantages. Non-volatile RAM must be set aside for the specific purpose of storing the operating state. This would require a considerable amount of storage. Particularly low end, i.e., cheap microprocessor or hardware designs such as applied in pagers, for instance, cannot afford to have this much memory dedicated for this purpose. This considerable amount of RAM is required due to the fact that a significant number of registers will need to be backed up upon detection of a primary battery removal so as to save the operating state. In this solution it is also necessary to know what the operating state is at all times. Since the non-volatile RAM is not part of the core-CPU RAM, it is essential that a checksum be performed on the operating state which has been backed up into non-volatile RAM as the nonvolatile RAM is only valid while the backup cell has enough voltage to maintain the non-volatile RAM. If there is no checking performed on the operating state when it is reloaded then there is substantial risk of an invalid state being reloaded causing unpredictable results. Furthermore, the method does not allow for the time of the device to be updated upon the main power source being replaced. For instance, if the main power source was removed at a given time and was left out for 10 minutes, then upon replacing the main power source, the time would be restored with a ten minutes time difference. A separate clock chip is needed to keep track of the time, which is an additional component requiring power. Low cost products would require a minimum number of components.

Thus, what is needed is a simpler and more reliable method and device for replacement of the main power source or for battery bouncing, or the like, preferably allowing battery replacement to be performed without causing user aggravation to duplicate an operation.

SUMMARY OF THE INVENTION

It is an object of the invention to provide a battery-operated electronic device reliably saving the operating state of a program function of an operational program in the device being performed upon removal of the main power source.

It is another object of the invention to avoid the use of external memory when saving and restoring the operating state of program function.

It is yet another object of the invention to provide a cheap mechanism to save and restore the operating state.

It is yet another object of the invention to provide a mechanism for detecting electrical disconnection or electrical reconnection of a removable main power source from and to the device, respectively.

It is yet another object of the invention to achieve energy saving in the device upon detection of main power source removal.

It is yet another object of the invention to also accurately keep track of the time and date upon detection of main power source removal and during replacement of the main power source.

In accordance with the invention, in a battery-operated portable electronic device, which device is adapted to receive a removable main power source, and which device comprises: electronic circuits, an auxiliary power source, and coupling and detection means for electrically coupling the main or the auxiliary power source to at least a part of the electronic circuits, and for detecting a power failure in said main power source, the electronic circuits compring a programmed processing unit including memory means for storing an operational program for operating the portable device, a set of operational registers, and a stack, the programmed unit being adapted to respond to at least one external interrupt signal,
  a) an electrical disconnect main power source interrupt signal is generated upon electrical disconnection of the main power source from the coupling and detection means, and
  b) the electrical disconnect main power source interrupt signal is responded to by pushing at least a subset of the set of operational registers on the stack so as to save an exact operational point of a currently executed program function of the operational program in the portable device, by pushing a main power source check routine on the stack, and by executing the main power source check routine on the stack, the main power source check routine restoring the at least saved subset of the set of operational registers, and causing the processing unit to return to the saved exact operational point of the currently executed program function, upon determining whether the main power source is electrically reconnected.

A great advantage is that it is not required to know what the current operating state is because when a electrical disconnection of the main power source from the device is detected then a main power source check routine is inserted on a stack of a microprocessor. The invention uses the standard operating mechanism of a microprocessor, saving the point in the operational program where an electrical disconnect main power source interrupt occurred on the stack, pushing and popping the main power source check routine to and from the stack, and controlling return to the point exactly before the electrical disconnect main power source interrupt occurred. No transfer of an operating state of a currently running program to non-volatile RAM is needed. Additionally, since only is dealt with the stack of the microprocessor, which is apart of the core microprocessor RAM, if the backup volatge would fall to an unacceptable level causing the microprocessor core RAM to become corrupted then a device reset would occur. Moreover, since the operating state was not moved to non-volatile RAM, there is no need to perform a check on the validity of the operating state. The main power check routine performs a main power source monitoring function, while on stack, and can easily be programmed such that only servicing of particular interrupts is allowed, such as a reconnect main power source interrupt which is generated upon detection of electrical reconnection of the main power source, and, additionally, if required, a timer interrupt. By enabling the timer interrupt, the time and date in the device can accurately be updated.

Preferably, a battery debounce mechanism is provided upon main power source replacement. Preferably, the device enters an energy saving state upon detection of an electrical disconnection of the main power source, using the auxiliary power source. In an embodiment of the invention time and date are kept accurately. Further embodiments are discussed hereinafter.

DESCRIPTION OF THE PREFERRED EMBODIMENT

Figure 1:
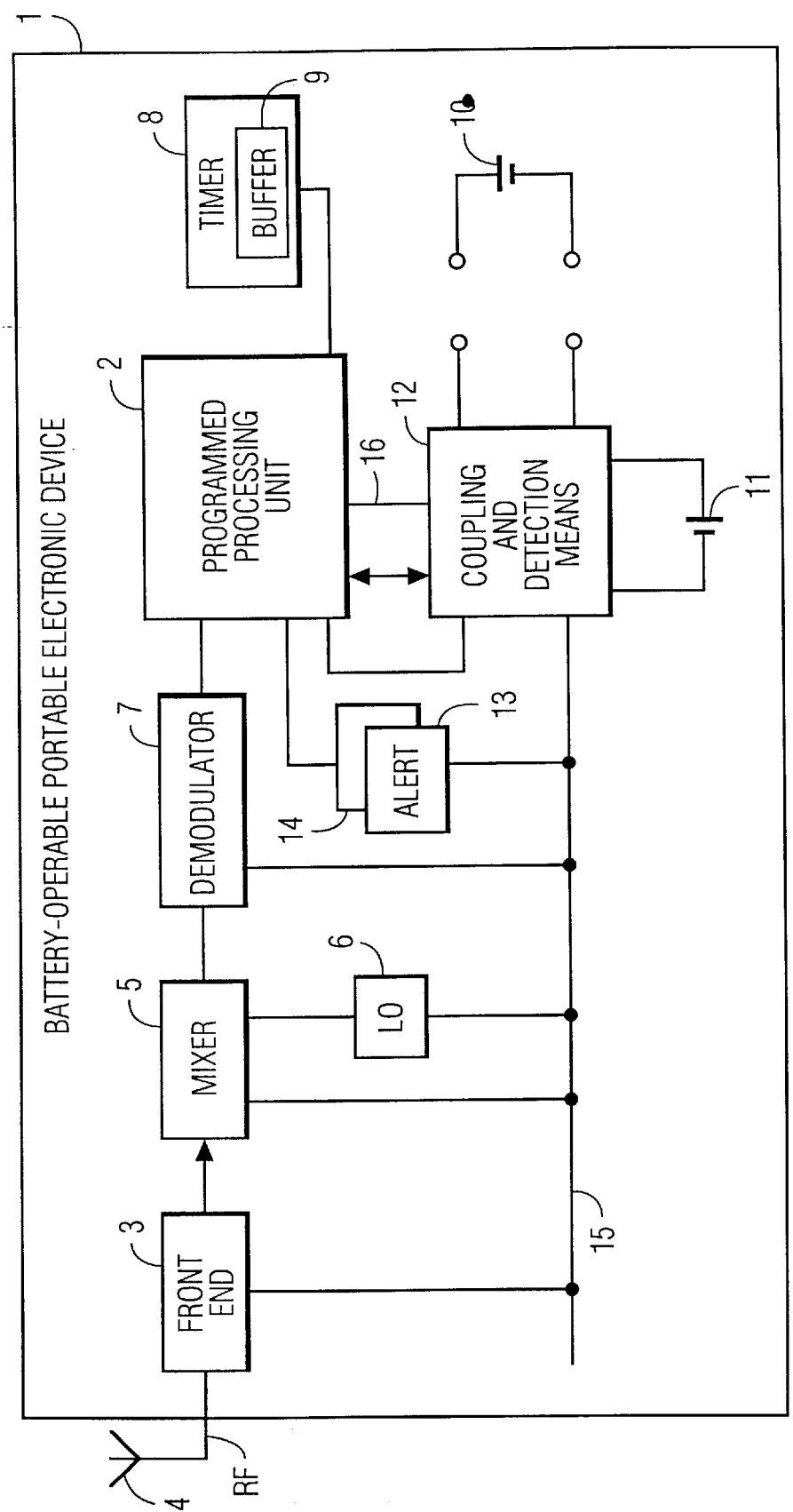
FIG. 1 is a block diagram illustrating an embodiment of a battery-operable portable electronic device including a programmed processing unit in accordance with the invention.

FIG. 1 is a block diagram illustrating an embodiment of a battery-operable portable electronic device 1 including a programmed processing unit 2 in accordance with a preferred embodiment of the invention. The battery-operable portable electronic device 1, in the given example a message pager, further comprises a radio front end 3, which is coupled to an antenna 4 and further to a mixer 5, a local oscillating means 6 coupled to the mixer 5 for causing the mixer to mix down a received radio signal RF, a demodulator 7 for demodulating mixed down signals, and a timer 8 including a buffer 9 for keeping track of the current time and date. Time keeping can also be done using a microcontroller, described in relation to FIG. 2, based interrupt or an external interrupt. This interrupt causes the microcontroller to manage the time keeping function. Then, no external clock chip is needed. Time generation itself can be software based, via a software interrupt timer. The device 1 still further comprises a removable main power source 10, an auxiliary power source 11, and coupling and detecting means 12. Furthermore, alert means 13 and display means 14, such as an LCD-screen, are provided. Internal power lines 15 and 16 are shown for powering internal units within the electronic device 1.

Figure 2:
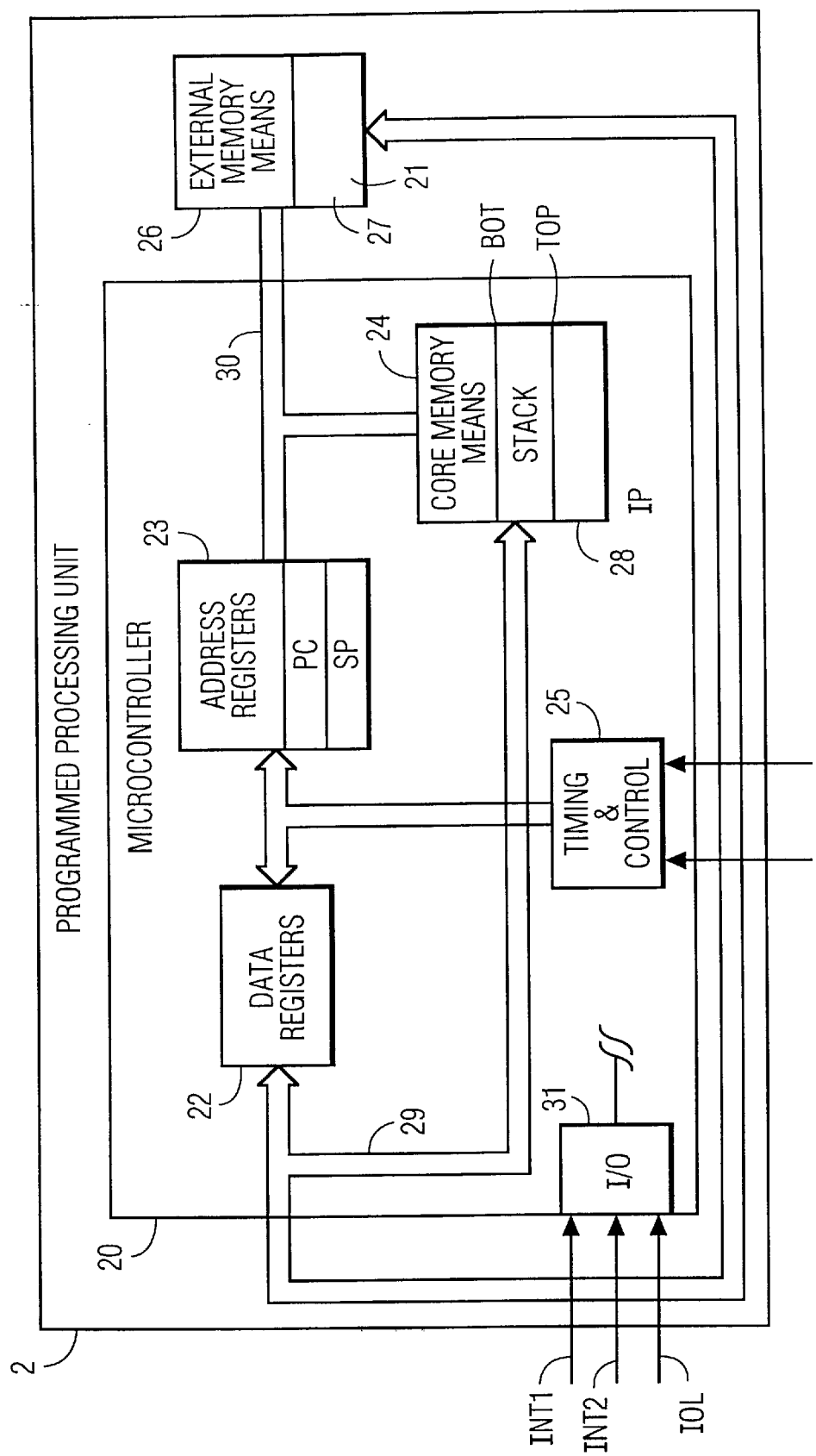
FIG. 2 is a more detailed block diagram of the programmed processing unit of FIG. 1.

FIG. 2 is a more detailed block diagram of the programmed processing unit of FIG. 1. The programmed processing unit 2 comprises a microcontroller and external memory means 21 externally coupled thereto. The microcontroller 20 comprises data registers 22, address registers 23, core memory means 24, and a timing an control unit 25, and further an ALU (Arithmetic Logic Unit), a status register, and an instruction register, the latter devices and the fucnction being well-known in the art and therefore not being shown in detail here. The external memory means 21 comprises a RAM memory 26 and a non-volatile memory 27, and the core memory means 24 comprises a RAM memory 28. The data registers 22, and the core memory means 24 are internally coupled to a data bus 29, the external memory means 21 is externally coupled to the data bus 29, the address registers 23, and the core memory means 24 are internally coupled to an address bus 30, and the external memory means 21 is externally coupled to the address bus 30. The address registers 23 comprise a stack pointer SP related to a so-called stack STACK, which is defined in the core memory means 24, and a program counter PC. The stack is a set of contiguous memory locations addressed by the stack pointer SP. As to the stack a bottom BOT of the stack and a top TOP of the stack are defined, the bottom of the stack referring to an empty stack, and the top of the stack referring to a memory location on top of the stack. The stack pointer SP designates the top of the stack. The microcontroller 20 uses the value of the stack pointer SP to address a memory location from which it reads or to which it writes a data item. Data stored on the stack, so-called pushed, are retrieved in a reverse order, so-called popped or pulled. In principle, each one of the address registers may be used as the stack pointer. The microcontroller 20 further comprises and input/output unit 31. Interrupt lines INT1 and INT2 are provided so that the programmed processing unit 2 can respond to external events, notably interrupts, and further I/O-lines IOL for uni- or bi-directional communication with units within the portable electronic device 1, such as exchange of control information with the coupling and detection means 12. Upon a power failure detection of the main power source 10, detected by the coupling and detection means 12 and signalled by it to the processing unit 2 via an interrupt, the processing unit 2 commands the coupling and detection means 12 to connect the auxiliary power source 11 to the power line 16, and, preferably, not to power the power line 15. Herewith, in the power failure mode, the electronic device consumes minimum power so that maximum time is available for recovering from a power failure. The latter is more important in case of a power failure caused by battery replacement than in case of power failure caused by a battery bounce.

Figure 3:
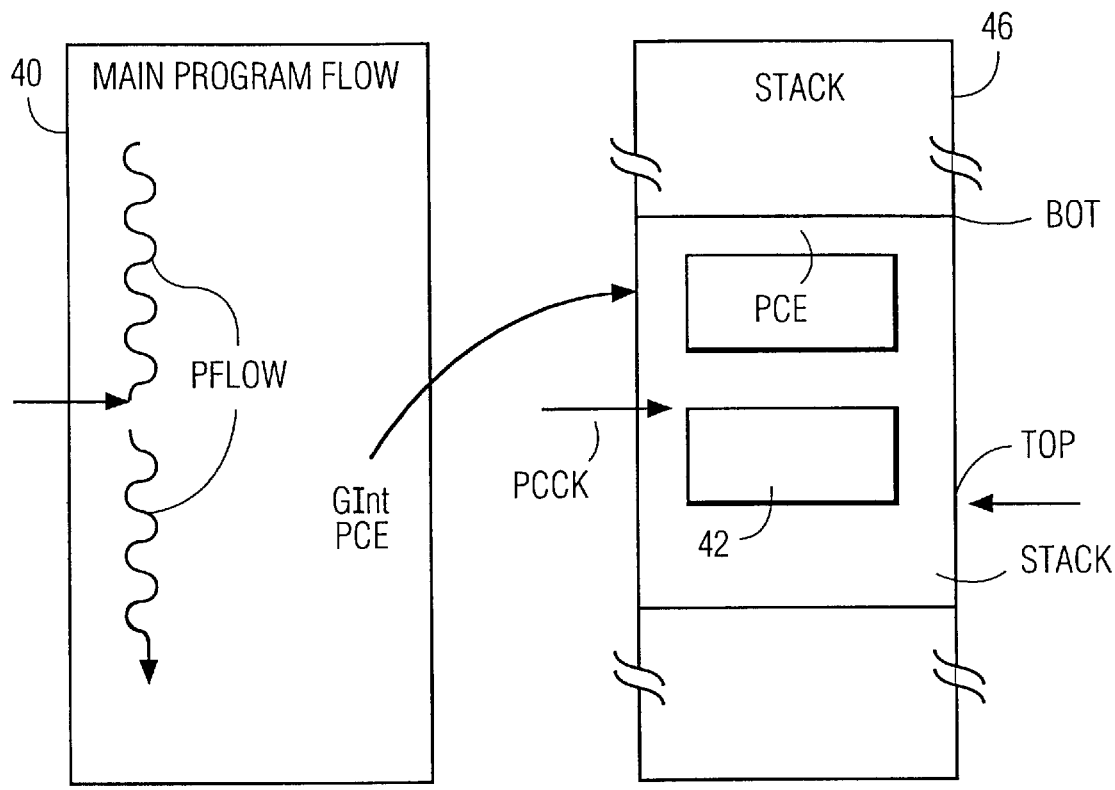
FIG. 3 is a main program flow and a stack illustrating an operation of the programmed processing unit of FIG. 1, including a main power source check routine.

FIG. 3 is a main program flow 40 and a stack 41 illustrating an operation of the programmed processing unit 2 of FIG. 1, including a main power source check routine 42. When the battery-operable portable electronic device 1 is operational, an operational program, indicated in FIG. 3 with waved line PFlow, which is stored in the external memory means 21 and which comprises several program functions, is executed. The structure of the operational program PFlow may be in the form a main routine in which subroutines are called when needed. Such a structure is well-known in the art. The microcontroller 20 saves information on the stack 42 whenever the flow of control in a program is altered by a call to a subroutine, an interrupt, or other events. The normal flow of the operational program PFlow, when the main routine or a subroutine is being executed, causes a consecutive sequence of program instructions from the external memory means to be executed. To this end, at the execution of an instruction, the program counter PC is incremented such that it refers to the next instruction to be executed. An interrupt causes control to be passed to an interrupt service routine, which can be stored in the external memory means 21, and which is associated with the interrupt, until an interrupt task is completed. Then, usually, control is returned to the next instruction in the preempted sequence. In a standard stack control mechanism, transfer and return is accomplished by saving the contents of the program counter PC, which refers to the instruction to be executed, on the stack 41 before control is passed to the service routine and then restoring the program counter PC afterwards so that the normal flow of the operational program is resumed.

Figure 4:
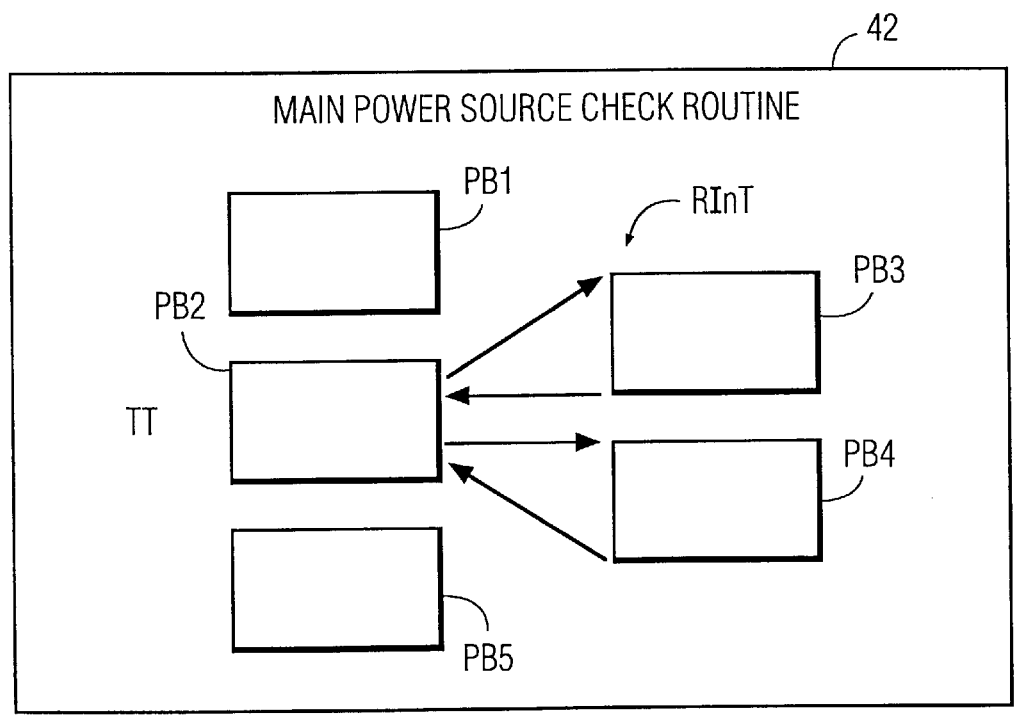
FIG. 4 is a program flow of the main power source check routine of FIG. 3.

According to the present invention, upon a main power source interrupt signal GInt on the interrupt line INT1, using the usual stack mechanism of the microcontroller 20, a value PCE of the program counter PC, which represents the exact point in the main routine where the interrupt occurred, is pushed on the stack 41, and thereafter, the main power source check routine 42, further to be described in relation to FIG. 4, is pushed on the stack 41. A return-from-interrupt instruction is then executed so that control passes to the main power source check routine 42, indicated with a value of the program counter PCCK. Upon exit of the main power source check routine 42, control is returned to the main program Pflow, to the exact point where the main program PFlow was left when the interrupt GInt occurred.

FIG. 4 is a program flow of the main power source check routine 42 of FIG. 3. Shown are program blocks or routines PB1, PB2, PB3, PB4, and PB5. In these blocks or routines, the following program functions are performed. PB1:

The coupling and detection means 12 are commanded to shut off all external devices that are not essential for recovering from a power failure, notably the devices 3, 5, 6, 7, 13, and 14 as shown in FIG. 1. Also, all interrupt liness other than INT1 and INT2, which are needed for the power failure detection and restoration and the timer function, respectively, are disabled. When the main power source interrupt condition still exits, the device 1 enters powerdown mode.

PB2:

Battery bouncing is implemented. This means that it is tested whether the interrupt is present for a predetermined time period TT, for example 2 seconds. Within this period, reconnect or main power interrupt signals RInt cause the program flow to be temporarily passed to a reconnect or good main power source interrupt routine PB3. The microcontroller 20 causes the main power source check routine 42 to proceed if it is established that the reconnect main power interrupt signal RInt was stable.

In order to prevent so-called motorboating in the device, in case of a pager, any alerts which were playing prior to the disconnect main power source interrupt signal GInt are canceled after reconnect main power source interrupt signal RInt is detected. Motorboating is a phenomena that occurs when the battery voltage reaches a value which causes a disconnect main power source condition. Typically, when the alert 13 or the display 14 is activated, the battery voltage will drop 100–200 mV. The pager then resets, and the external devices 13 and 14 are deactivated. This causes the battery voltage to rise. The pager then attempts to perform a power-up alert, causing another reset to occur. This cycle will continue to happen until the battery voltage drops to the point that it can no longer do a basic power-up.

Preferably, the interrupt line INT1 is used for servicing both the disconnect and reconnect main power source interrupt signals GInt and RInt. This is accomplished by using an interrupt polarity register IP. Initially, the interrupt is set to look for an active low on the interrupt line INT1, indicating an electrically disconnected main power source 10. While in the main power source check routine 42, the polarity is changed to an active high, the device 1 enters a powerdown mode, and waits for a reconnect main power source interrupt signal to wake up the microcontroller 20.

PB3:

Is an interrupt service routine in which the microcontroller 20 wakes up from powerdown mode. Immediately thereafter, returned is to the current program flow in the program block PB2.

PB4:

Is an interrupt service routine to service timer interrupts that appear on the interrupt line INT2. Any accumulated time ticks, e.g., minutes, which are stored in the buffer 9, are processed by the microcontroller 20 so that the time and date function is updated.

PB5:

The microcontroller 20 causes the main power source check routine 42 to exite, i.e., the check routine 42 is popped off from the stack 41, and to pass control to the main program flow Pflow at the exact location where it was left, i.e., at the location PCE. The microprocessor 20 causes the main program to update its software clock with the number of received minute ticks while the check routine 42 is executed.

If more than a predetermined number of minute ticks, for example 30 ticks, were received in the check routine 42, the device 1 is reset. This is because the auxiliary power source 11 can only guarantee memory integrity for a limited length of time.

What is claimed is:

1. A battery-operable portable electronic device adapted to receive a removable main power source, comprising:

electronic circuits, an auxiliary power source, and coupling and detection means for electrically coupling the main or the auxiliary power source to at least a part of the electronic circuits, and for detecting a power failure in said main power source, the coupling and detection means being configured for generating an electrical disconnect main power source interrupt signal upon electrical disconnection of the main power source from the coupling and detection means, the electronic circuits comprising:

a processing unit including memory means for storing an operational program for operating the portable device, a set of operational registers, and a stack, the processing unit being adapted to respond to at least one external interrupt signal, wherein the processing unit is configured for responding to the electrical disconnect main power source interrupt signal by pushing at least a subset of the set of operational registers on the stack so as to save an exact operational point of a currently executed program function of the operational program in the portable device, by pushing a main power source check routine on the stack, and by executing the main power source check routine on the stack, the main power source check routine restoring the at least saved subset of the set of operational registers, and causing the processing unit to return to the saved exact operational point of the currently executed program function, upon determining whether the main power source is electrically reconnected.

2. The battery-operable portable electronic device of claim 1, wherein the processing unit is configured for popping off the main power source check routine from the stack before return to the exact operational point of the currently executed program function.

3. The battery-operable portable electronic device of claim 1, wherein the device is configured for determining the electrical reconnection using a polling mechanism sensing the presence of a voltage.

4. The battery-operable portable electronic device of claim 1, wherein the coupling and detection means are configured for detecting the electrical connection and for generating a reconnect main power source interrupt signal upon detection of the electrical reconnection.

5. The battery-operable portable electronic device of claim 4, wherein the processing unit is configured for determining whether the reconnect main power source interrupt signal represents a stable reconnect condition for a predetermined period of time.

6. The battery-operable portable electronic device of claim 1, wherein the device comprises shutting down means for electrically shutting down at least a part of the electronic circuits upon determination of a power failure.

7. A battery-operable portable electronic device adapted to receive a removable main power source, comprising: electronic circuits, an auxiliary power source, and coupling and detection means for electrically coupling the main or the auxiliary power source to at least a part of the electronic circuits, and for detecting a power failure in said main power source, the coupling and detection means being configured for generating an electrical disconnect main power source interrupt signal upon electrical disconnection of the main power source from the coupling and detection means, the electronic circuits comprising:

a processing unit including memory means for storing an operational program for operating the portable device, a set of operational registers, and a stack, the processing unit being adapted to respond to at least one external interrupt signal, wherein the processing unit is configured for responding to the electrical disconnect main power source interrupt signal by pushing at least a subset of the set of operational registers on the stack so as to save an exact operational point of a currently executed program function of the operational program in the portable device, by pushing a main power source check routine on the stack, and by executing the main power source check routine on the stack, the main power source check routine restoring the at least saved subset of the set of operational registers, and causing the processing unit to return to the saved exact operational point of the currently executed program function, upon determining whether the main power source is electrically reconnected, wherein the device further comprises a timing means for at least keeping track of time, and the processing unit is configured for updating its timing from the timing means at external timing interrupt signals generated by the timing means, the timing means including a buffer for cumulatively storing time tick units in between the external timing interrupt signals.

8. A battery-operable portable electronic device of claim 7, wherein the processing unit is configured for popping off the main power source check routine from the stack before return to the exact operational point of the currently executed program function.

9. A battery-operable portable electronic device of claim 7, wherein the device is configured for determining the electrical reconnection using a polling mechanism sensing the presence of a voltage.

10. The battery-operable portable electronic device of claim 7, wherein the coupling and detection means are configured for detecting the electrical connection and for generating a reconnect main power source interrupt signal upon detection of the electrical reconnection.

11. The battery-operable portable electronic device of claim 10, wherein the processing unit is configured for determining whether the reconnect main power source interrupt signal represents a stable reconnect condition for a predetermined period of time.

12. The battery-operable portable electronic device of claim 7, wherein the device comprises shutting down means for electrically shutting down at least a part of the electronic circuits upon determination of a power failure.

13. A method for use in a battery-operable portable electronic device, which device is adapted to receive a removable main power source, and which device comprises: electronic circuits, an auxiliary power source, and coupling and detection means for electrically coupling the main or the auxiliary power source to at least a part of the electronic circuits, and for detecting a power failure in said main power source, the electronic circuits comprising a processing unit including memory means for storing an operational program for operating the portable device, a set of operational registers, and a stack, the processing unit being adapted to respond to at least one external interrupt signal, the method comprising:

a) generating an electrical disconnect main power source interrupt signal upon electrical disconnection of the main power source from the coupling and detection means, and b) responding to the electrical disconnect main power source interrupt signal by pushing at least a subset of the set of operational registers on the stack so as to save an exact operational point of a currently executed program function of the operational program in the portable device, by pushing a main power source check routine on the stack, and by executing the main power source check routine on the stack, the main power source check routine restoring the at least saved subset of the set of operational registers, and causing the processing unit to return to the saved exact operational point of the currently executed program function, upon determining whether the main power source is electrically reconnected.

* * * * *